April 19, 1932. J. C. ALKIRE 1,854,727
ORIFICE FITTING
Filed Sept. 18, 1929
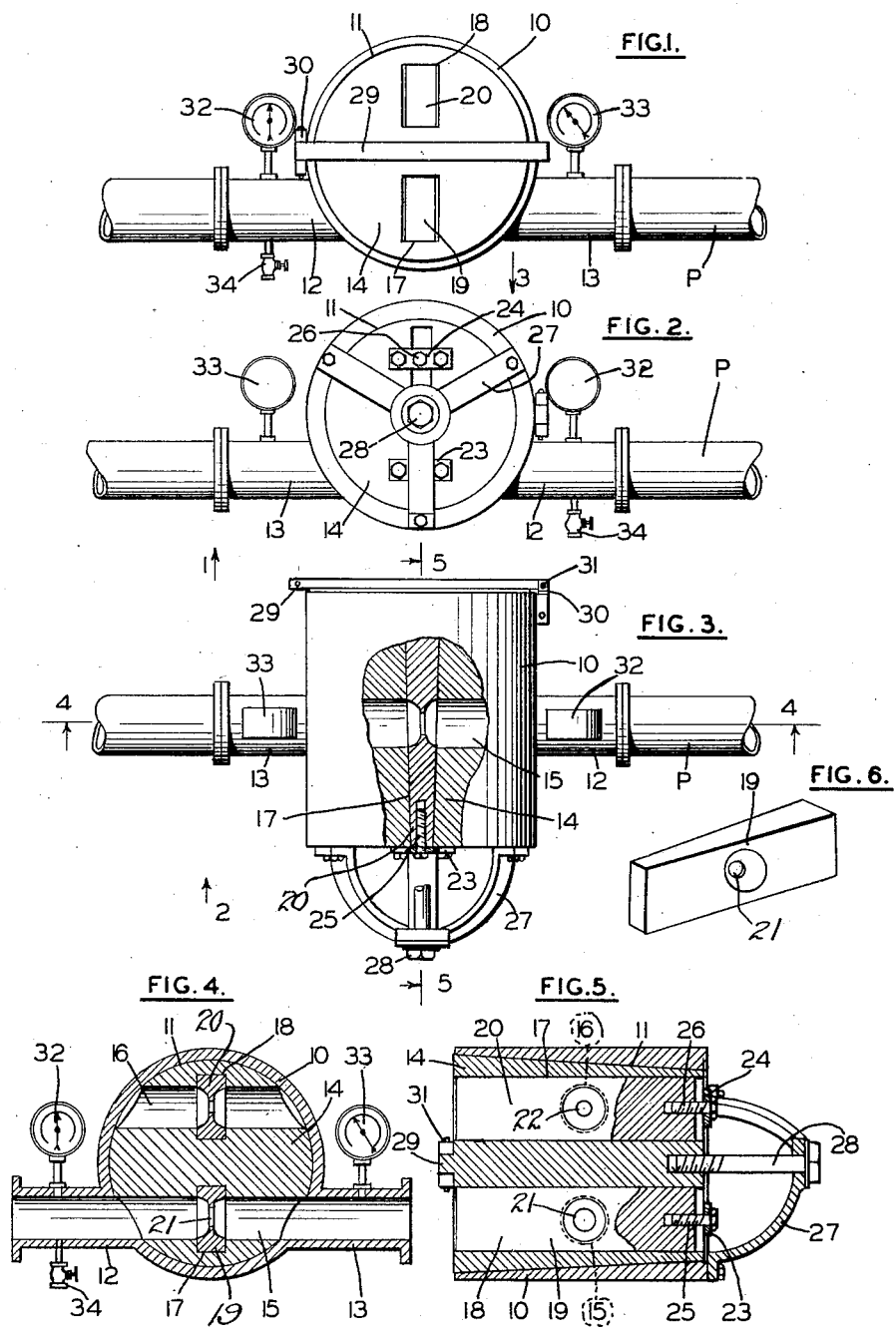
INVENTOR
JOHN C. ALKIRE
BY Hazard and Miller
ATTORNEYS Patented Apr. 19, 1932

1,854,727

UNITED STATES PATENT OFFICE

JOHN C. ALKIRE, OF BREA, CALIFORNIA

ORIFICE FITTING

Application filed September 18, 1929. Serial No. 393,494.

This invention relates to an orifice fitting.

An object of the invention is to provide a cheap, simple and durable construction which may be incorporated in a pipe line conveying gases under pressure and which will enable the ready substitution of one orifice member for another. The general objects of such a construction are well known and generally understood, the principal object being to have a calibrated orifice in the pipe line so that all of the gas will be forced to pass therethrough and to provide suitable means for measuring pressures on both sides of the orifice to determine the rate of flow through the pipe line. There are occasions in which it is desired to substitute a member having one size of orifice for another in the pipe line without being required to stop the flow through the pipe line for any material length of time. The object of this invention is to provide an improved construction wherein one orifice member can be easily and quickly substituted for another without stopping the flow through the pipe line for any material length of flow.

Another object of the invention is to provide a simple construction which can be made substantially leak proof.

With the foregoing and other objects in view, which will be made manifest in the following detailed description, and specifically pointed out in the appended claims, reference is had to the accompanying drawings for an illustrative embodiment of the invention, wherein:

Fig. 1 is a view in front elevation of the improved orifice fitting illustrating it as having been installed in a pipe line.

Fig. 2 is a rear view in elevation of the same.

Fig. 3 is a top plan view of the orifice fitting in the pipe line, parts being broken away and shown in vertical section.

Fig. 4 is a vertical section taken substantially upon the line 4—4 upon Fig. 3.

Fig. 5 is a vertical section taken substantially upon the line 5—5 upon Fig. 3.

Fig. 6 is a perspective view of one of the orifice members.

Referring to the accompanying drawings, wherein similar reference characters designate similar parts throughout, the improved orifice fitting comprises a body 10 which is preferably cylindrical in form and has a slightly tapered interior transverse bore 11. Near the bottom of the body, so as to be otherwise than on a diameter, there are tubular extensions 12 and 13 which constitute the inlet and outlet to the body. These extensions are flanged for attachment to the pipe line P. On the interior of the body there is rotatable a tapered movable member 14 which has a taper complementary to the tapered bore on the interior of the body. This movable member has two parallel passages 15 and 16 formed therein which are equi-distant from the center of the movable member so that on rotating the movable member either of the passages 15 or 16 may be placed in alignment with the tubular extensions 12 and 13 to permit the fluid, such as gas, to flow therethrough. Tapered openings 17 and 18 extend longitudinally through the movable member 14 and intersect the passages 15 and 16 respectively. These openings received interchangeable orifice members indicated at 19 and 20, each being provided with an orifice 21 and 22 which has been carefully calibrated. The openings 17 and 18 taper toward the small end of the movable member 14 and on this small end of the movable member there are positioned bridge pieces 23 and 24. Suitable bolts 25 and 26 extend through these bridge pieces and are threaded into the orifice members 19 and 20 so as to be capable of forcing the orifice members toward the small ends of their respective openings, thus causing them to fit tightly in their openings. When the wedge shaped orifice members 19 and 20 are thus caused to fit tightly in their openings, the orifice in each member will be positioned centrally of its respective passage 15 or 16, as the case may be.

On the rear end of the body there is secured a spider or yoke 27 through which a bolt 28 extends, which is threaded into the movable member 14 so as to draw the movable member toward the small end of the bore 11 and cause it to fit tightly. On the forward end of the movable member 14 there is formed a diametrical rib 29, the ends of which project laterally and are receivable in a hinged hasp 30, through which a removable pin 31 can be placed, extending through the projecting end of the rib so as to lock the movable member 14 in adjusted position. Pressure gauges 32 and 33 are mounted on the tubular extension 12 and 13 to determine the pressures on each side of the orifice positioned in the stream of flow. The reference character 34 indicates a drain cock which may be employed for drainage purposes.

When the orifice fitting is in the position as shown in the drawings, the gas enters one tubular extension, flows through the passage 15 and through the orifice 21 in the orifice member 19 positioned therein. As this orifice has been carefully calibrated, the rate of flow through the pipe line can be determined from the difference in pressures indicated by the two pressure gauges 32 and 33. When it is desired to substitute an orifice of different size in the pipe line for the orifice 21, the pin 31 is removed and the hasp swung out of engagement with the rib 29. The rotary member 14 can then be rotated so as to position the passage 16 in alignment with the tubular extensions 12 and 13. This positions the orifice member 18 with its orifice 22 in the center of the stream of flow.

In the event that an orifice of a still different size is desired to be inserted, this can be easily accomplished by taking out bolt 25, which will be connected to the orifice member which is then upper-most. As soon as this bolt is removed, the orifice member can be driven forwardly out of its tapered opening and another orifice member substituted therefor. As soon as this other orifice member has been substituted and tightened in place, the rotary member 14 can be rotated to position it in the stream of flow.

It will be appreciated that the improved orifice fitting is of an extremely simple yet durable construction. There are very few moving parts to wear and leakage is effectively prevented. One size of orifice can be easily and quickly substituted for another and in making the change it is only necessary to shut off the continuous flow through the pipe line for the short period of time required in rotating the rotary member 14.

Various changes may be made in the details of construction without departing from the spirit or scope of the invention as defined by the appended claims.

I claim:

1. An orifice fitting comprising a body having an inlet and an outlet, a rotatable member in the body having a plurality of passages each of which may be so positioned as to permit flow from the inlet to the outlet, there being openings in the rotatable member the axes of which extend across said passages, and orifice members removably positioned in said openings.

2. An orifice fitting comprising a body having an inlet and an outlet, said inlet and outlet being arranged otherwise than on a diameter through the body, a rotatable member in the body having passages each of which may be so positioned as to permit flow therethrough between the inlet and the outlet, there being tapered openings in the rotatable member intersecting said passages, orifice members removably positioned in the openings, and means for urging the orifice members toward the small ends of their respective openings.

3. An orifice fitting comprising a body having an inlet and an outlet, a tapered rotatable member in the body, means for urging the rotatable member in the direction of its small end, said rotatable member having passages therein each of which may be positioned so as to permit flow from the inlet to the outlet, there being openings in the rotatable member communicating with said passages, and orifice members removably positioned therein.

4. An orifice fitting comprising a body having an inlet and an outlet, a tapered rotatable member in the body, means for urging the rotatable member in the direction of its small end, said rotatable member having passages therein each of which may be positioned so as to permit flow from the inlet to the outlet, there being tapered openings in the rotatable member communicating with said passages, orifice members removably positioned therein, and means for urging the orifice members toward the smaller ends of their respective openings.

5. An orifice fitting comprising a body having an inlet and an outlet, a rotatable member in the body, said rotatable member having passages extending transversely therethrough adapted to establish communication between the inlet and outlet, each passage being arranged upon a secant through the body, there being longitudinal openings in the body intersecting said passages, and orifice plates removably positioned in said longitudinal openings.

In testimony whereof I have signed my name to this specification.

J. C. ALKIRE.